(12) United States Patent
Bhardwaj et al.

(10) Patent No.: US 9,780,680 B2
(45) Date of Patent: Oct. 3, 2017

(54) FREQUENCY CONTROLLED POWER CONVERTER CHARACTERIZATION APPARATUS AND METHODS

(71) Applicant: TEXAS INSTRUMENTS INCORPORATED, Dallas, TX (US)

(72) Inventors: Manish Bhardwaj, Sugar Land, TX (US); Sam Gnana Sabapathy, Sugar Land, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/284,320

(22) Filed: Oct. 3, 2016

(65) Prior Publication Data

US 2017/0099006 A1    Apr. 6, 2017

Related U.S. Application Data

(60) Provisional application No. 62/236,536, filed on Oct. 2, 2015.

(51) Int. Cl.
*H02M 5/04* (2006.01)
*H02M 3/156* (2006.01)

(52) U.S. Cl.
CPC ............ *H02M 5/04* (2013.01); *H02M 3/156* (2013.01)

(58) Field of Classification Search
CPC .......... H02M 5/04; H02M 5/27; H02M 5/271; H02M 5/272; H02M 5/297; H02M 3/156; H03B 19/00; H03B 19/16; H02J 3/34; H02P 9/42

USPC .................................................. 363/157–165
See application file for complete search history.

(56) References Cited

U.S. PATENT DOCUMENTS

| | | | |
|---|---|---|---|
| 8,538,558 B1* | 9/2013 | Sabapathy | G06F 11/0751 700/21 |
| 2004/0170237 A1* | 9/2004 | Chadha | H04L 27/2663 375/343 |
| 2007/0053454 A1* | 3/2007 | Bhardwaj | H04L 25/0236 375/260 |
| 2016/0248658 A1* | 8/2016 | Patel | H04L 45/02 |

* cited by examiner

*Primary Examiner* — Yemane Mehari
(74) *Attorney, Agent, or Firm* — John R. Pessetto; Charles A. Brill; Frank D. Cimino (57) ABSTRACT

A frequency-controlled power converter includes a power stage frequency response characterization circuit. A PWM input control value F_OL_CTL generates a PWM output control signal to drive the converter to a selected output voltage. F_OL_CTL is added to each of a set of periodic, incrementally time-sequenced discrete frequency deviation control values F_DEV(t) having a periodicity of F_RESP corresponding to a frequency at which a response of the power stage is to be measured. A resulting set of perturbed PWM input control values F_CTL_PTB(t) frequency-modulate the PWM output control signal and perturb the converter output voltage. A corresponding set of perturbed converter output voltage samples V_OUT_PTB(t) is cross-correlated to the set of F_CTL_PTB(t) to generate correlation components of V_OUT_PTB(t) and F_CTL_PTB(t). Real and imaginary components of a frequency response of the converter power stage are determined from the correlation components for each F_RESP and together form the power stage transfer function.

20 Claims, 6 Drawing Sheets

FREQUENCY CONTROLLED POWER CONVERTER CHARACTERIZATION APPARATUS AND METHODS

PRIORITY CLAIM

This application claims the benefit of priority under 35 U.S.C. §119(e) to U.S. Provisional Patent Application Ser. No. 62/236,536 titled "METHOD TO MEASURE FREQUENCY RESPONSE IN LLC/RESONANT CONVERTERS TO AID IN COMPENSATION DESIGN AND DIAGNOSTICS," filed on Oct. 2, 2015 and incorporated herein by reference in its entirety.

TECHNICAL FIELD

Embodiments described herein relate to frequency controlled power converters, including structures and methods associated with measuring and utilizing converter power stage frequency response characteristics.

BACKGROUND INFORMATION

Switched power converters have largely replaced linear regulators due to their higher efficiencies and smaller size and weight for a given power-handling capability. Switched converters have themselves evolved from lower-frequency duty cycle controlled pulse-width modulated designs to current frequency-controlled designs.

Figures 1, 2:
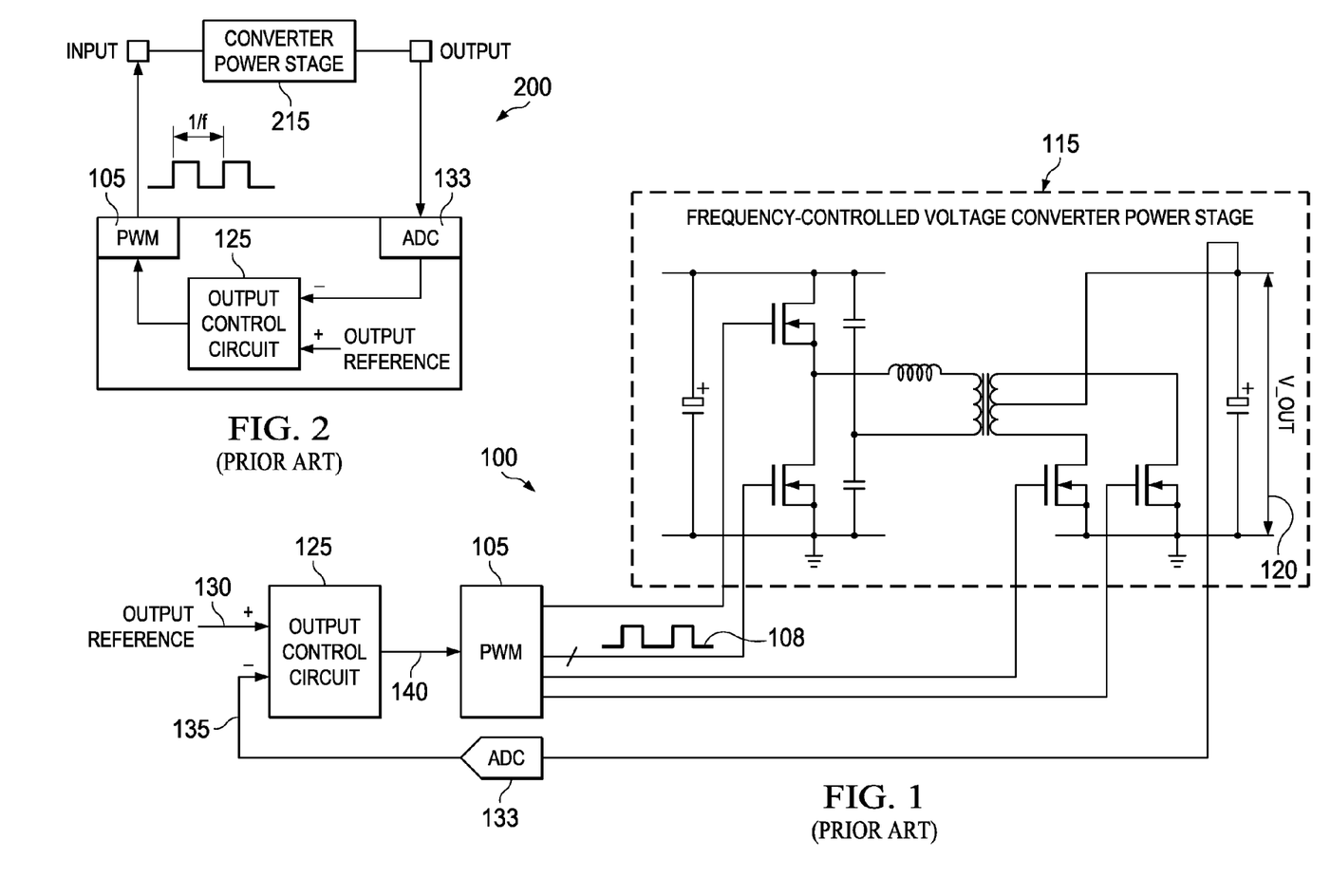
FIG. 1 is a prior-art schematic diagram of a frequency-controlled voltage converter.
FIG. 2 is a prior-art block diagram of a frequency-controlled voltage converter.

FIG. 1 is a prior-art schematic diagram of a frequency-controlled voltage converter 100. For purposes of this background discussion, the voltage converter 100 is representative of frequency-controlled power converters generally, including both voltage and current converters. A pulse-width modulator ("PWM") 105 generates a rectangular control signal 108, typically a square wave although not necessarily so. Edges of the control signal 108 control the switching of transistors in a converter power stage 115. The on and off states of the power stage switching transistors alternately allow and prevent current flow to and from various energy storage devices within the power stage 115. For a frequency-controlled voltage converter such as the converter 100 of FIG. 1, the frequency of the control signal 108 determines the power stage switching frequency and consequently the converter output voltage V_OUT 120. Although the example power stage 115 of FIG. 1 happens to implement an LLC resonant type converter, frequency-controlled power stages may be of various designs.

The level of V_OUT 120 is maintained for various output load conditions via a negative feedback control system. A sample of V_OUT 120 is fed back to the PWM 105 to increase or decrease the frequency of the control signal 108 to compensate for decreases in V_OUT 120 due to increased output loading or increased converter input voltage, etc. The feedback control system may be analog or digital. In the case of a digital control system, an analog-to-digital converter ("ADC") samples V_OUT 120 and sends a digital value corresponding to the instantaneous magnitude of V_OUT 120 to an inverting input 135 of an output control circuit 125. The V_OUT 120 sample value is compared by the control circuit 125 to a reference value sent to the control circuit 125 on an input 130. Alternatively, or in addition, the reference value may be stored in a register of the control circuit 125. The control circuit 125 compares the V_OUT 120 sample value to the reference value and may perform various control loop compensation operations. The control circuit 125 sends a frequency-controlling signal or value to the PWM 105 on an input 140. In the case of a digital PWM input, the frequency-controlling value may represent either a frequency or a period of the PWM output signal. The PWM 105 generates the switching control signal 108 at a frequency corresponding to the frequency-controlling value or signal received from the control circuit 125.

The control circuit 125 may perform control loop compensation operations as previously mentioned. Such compensation operations are designed to improve the function of maintaining a constant V_OUT 120 in light of changing converter voltage input, output loading, noise on the input voltage waveform or noise seen at the converter output, etc. However, such loop compensation operations generally utilize characterization information for the converter power stage, including the power stage frequency response or transfer function. The latter are dependent upon the design and component values of each individual converter's power stage. Even for a known design, the transfer function of a power stage associated with a frequency-controlled power converter is difficult to determine due to the complex behavior and interactions of the various energy storage components.

FIG. 2 is a prior-art block diagram of a frequency-controlled voltage converter 200 such as the converter 100 previously described with reference to FIG. 1. The converter 200 includes the PWM 105, the output control circuit 125 and the ADC 133, all as previously described for the converter 100 of FIG. 1. The converter 200 also includes the power stage 215, and is included merely to illustrate that the example power stage 215 referred to subsequently herein may be of any frequency-controlled design.

SUMMARY OF THE INVENTION

Structures and methods disclosed herein operate to characterize the frequency response of a power stage of a frequency-controlled power converter. The term "power converter" as used herein means either a voltage converter or a current converter. Although a voltage converter is referred to in examples herein, disclosed structures and methods are equally applicable to current converters. Characterization methods described using an example method below are implemented by characterization component portions of the power converter feedback control circuit. The feedback control circuit may be configured for "operational" mode or "characterization" mode. Operational mode refers to normal, closed-loop converter operation as previously described in the Background Information section.

In characterization mode, the converter control feedback loop is opened. The converter output is loaded with a chosen load value generally representative of loading which occurs during operational mode. A nominal converter output voltage level V_OUT_F_OL to be generated during characterization mode operation is chosen. A PWM control value F_OL_CTL corresponds to a PWM output control signal frequency of F_OL ("frequency, open-loop"). F_OL is also referred to herein as the "center frequency." If loaded into the PWM at the PWM control input, F_OL_CTL causes the PWM to generate a rectangular (e.g., a square wave) converter switching control signal having a frequency of F_OL. The PWM output control signal drives the converter output to the nominal voltage level V_OUT_F_OL.

An incrementally time-sequenced set of discrete frequency deviation control values F_DEV(t)= F_DEV_MAX*SIN($2\pi$*F_RESP*t) is repeatedly generated at a rate of F_RESP equal to a selected frequency at which a response of the power stage is to be measured. If plotted as a function of incremental values of t, the set of F_DEV(t) form a discontinuous (dotted) shape of a conceptual sinusoidal waveform of the selected frequency F_RESP. In the interest of convenience and clarity of explanation, the time-sequenced set of discrete frequency deviation control values F_DEV(t) is alternatively referred to herein in terms of the aforementioned conceptual sinusoidal waveform, variously denominated "perturbation waveform" or "sinusoidal perturbation waveform." In the latter explanatory context, the set of discrete frequency deviation control values is referred to as a set of "samples of the perturbation waveform."

When added to F_OL_CTL, the set of frequency deviation control values F_DEV(t) result in a temporally corresponding time-sequenced set of discrete perturbed frequency control values F_CTL_PTB(t). At each incremental time t, F_CTL_PTB(t) is loaded into the PWM. The time-sequenced set of F_CTL_PTB(t) cause the PWM to incrementally deviate a converter output voltage-determining control signal from a center frequency F_OL. The amount of the deviation at any incremental time t is proportional to F_DEV(t) and repeats at a rate equal to F_RESP. The periodicity of each set of frequency deviations is equal to 1/F_RESP. The maximum frequency deviation is equal to the peak magnitude F_DEV_MAX of the sinusoidal perturbation waveform F_DEV(t) and is much smaller than the center frequency F_OL. "Perturbed" and "perturbation" shall mean, in the context of this disclosure, causing F_OL to vary periodically over time by a small magnitude of frequency relative to the magnitude of F_OL. Characteristics of the sinusoidal perturbation waveform and example apparatus for generating samples of the perturbation waveform are described in the Detailed Description below.

A value of F_RESP is selected to generate a sequence of frequency control values F_CTL_PTB(t). The values F_CTL_PTB(t) are sequentially loaded into the PWM to generate a perturbed switching frequency control signal at the PWM output. After loading each such control value, the magnitude of a resulting perturbed converter output voltage V_OUT_PTB(t) is measured. Pairs of F_CTL_PTB(t) frequency control values and V_OUT_PTB(t) sample values are cross-correlated using a dual discrete Fourier transform ("DFT"). DFT summation logic contains real and imaginary component values representing the correlated PWM control values and the corresponding correlated perturbated output voltage samples. Real and imaginary components of the frequency response H(F_RESP) corresponding to a single value of F_RESP are determined from the DFT outputs as further described below. H(F_RESP) components for the selected F_RESP are stored in a power stage transfer function table. F_RESP is incremented to generate a different set of F_CTL_PTB(t) control values and V_OUT_PTB(t) samples in order to acquire additional frequency response data points until the transfer function table is full. Frequency response gain and phase curves corresponding to the converter power stage may be generated from the transfer function table as further described below.

Once acquired, the converter power stage transfer function data may be used for various purposes, including control loop shaping during closed-loop operational mode. Periodic or power-on testing, including testing during manufacturing, may be performed by employing the characterization apparatus to build a new transfer function table to confirm that the converter power stage transfer function is or continues to be within a selected tolerance of a predetermined (e.g., stored) transfer function, etc.

DETAILED DESCRIPTION

Figure 3:
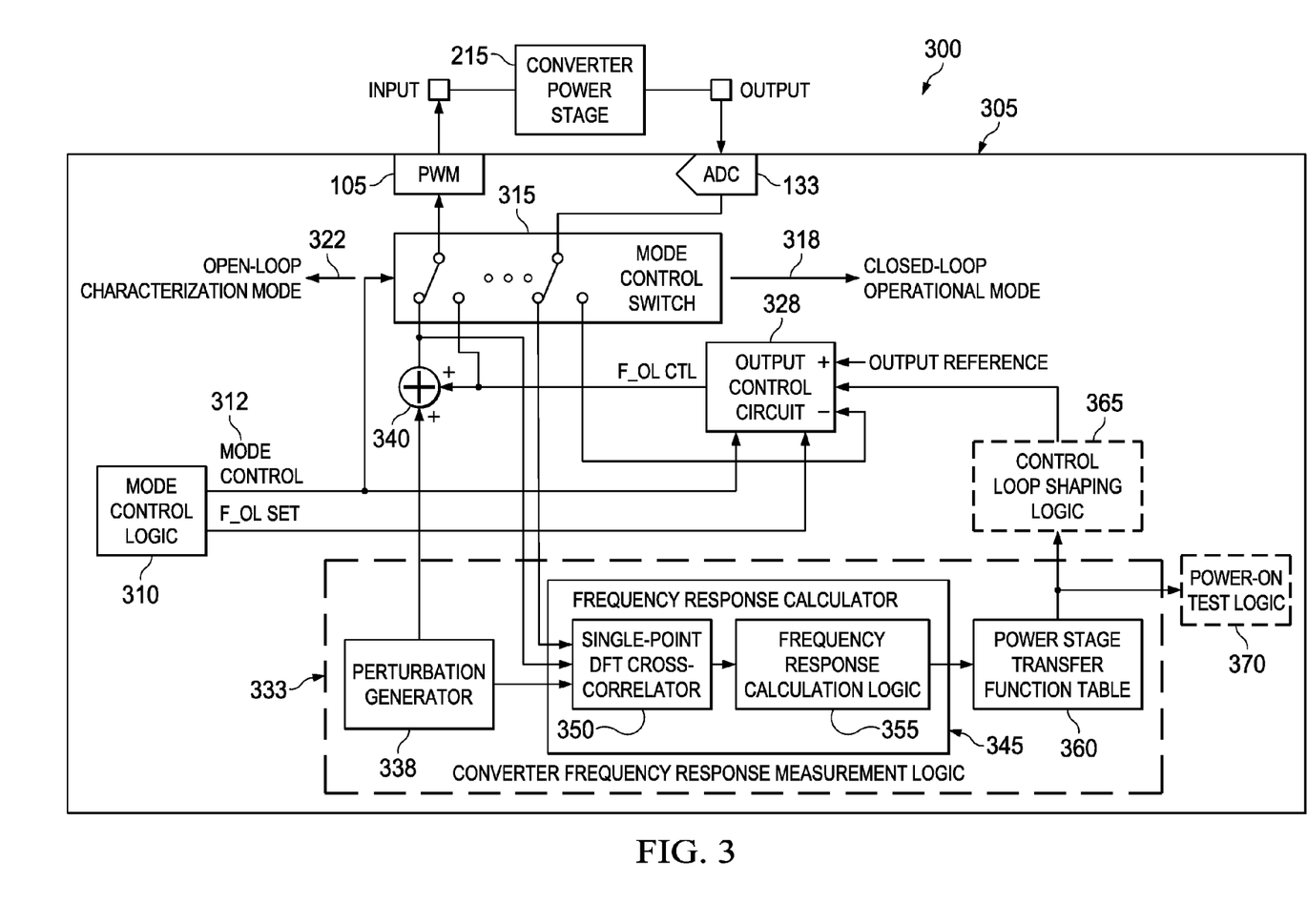
FIG. 3 is block diagram of an example frequency-controlled power converter according to various embodiments of the invention.

FIG. 3 is block diagram of an example frequency-controlled power converter 300 according to various embodiments of the invention. The example power converter 300 presents a controlled voltage across its output terminals and may thus be classified as a voltage-type power converter. However, the structures and methods described below also apply to current-type power converters, as previously mentioned.

The power converter 300 includes a switching power stage 215. The power stage 215 operates as previously described in the Background Information section. Novel power converter embodiments described herein also include a feedback control and test circuit ("FCT") 305 coupled between input and output terminals of the power stage 215. The FCT circuit 305 includes an open-loop frequency response characterization apparatus as described hereinafter. The open-loop frequency response characterization apparatus operates according to methods also described here below.

The FCT circuit 305 of the power converter 300 includes a mode control logic module 310. The mode control logic module 310 configures the feedback control and test circuit 305 to a closed-loop operational mode or to an open-loop characterization mode. It does so by exerting a mode control signal on a mode control output 312. The FCT circuit 305 also includes a mode control switch 322 coupled to the mode control logic module 310. The mode control switch 322 switches the FCT circuit 305 input and output paths to and from a different set of components within the FCT circuit 305 depending upon the operational mode selected by the mode control logic module 310.

A closed-loop operational mode state of the mode control signal 312 causes the mode control switch 322 to close a feedback control path by directing power converter output magnitude values received from an ADC 133 to an output control circuit 328. During closed-loop operational mode, the mode control switch 315 also directs an operational mode feedback frequency control value received from the output control circuit 328 to the input of a PWM 105.

In contrast, an open-loop operational mode state of the mode control signal 312 causes the mode control switch 322 to open the feedback control path by directing power converter output magnitude values received from the ADC 133 to a converter frequency response measurement logic module 345. During open-loop characterization mode, the mode control switch also directs a perturbed frequency control value F_CTL_PTB(t) to the input of the PWM 105 as further described below.

The FCT circuit 305 of the power converter 300 also includes a converter frequency response measurement logic module 333 coupled to the mode control switch 315. The frequency response measurement logic module 333, operational during characterization mode operation, includes a perturbation generator 338. The perturbation generator 338 generates a perturbation waveform F_DEV(t) of a selected frequency F_RESP equal to a frequency at which a response of the power stage 215 is to be measured.

The FCT circuit 305 of the power converter 300 also includes an adder 340 coupled to the perturbation generator 338. The adder 340 sums magnitude sample values of F_DEV(t) and a value of a center frequency-establishing component F_OL_CTL. A resulting perturbed frequency control value F_CTL_PTB(t) is equal to F_DEV(t)+F_OL_CTL. The value F_CTL_PTB(t) is loaded into the PWM 105. As t is incremented, time sequenced values of F_CTL_PTB(t) cause the PWM 105 to sinusoidally deviate a converter output voltage-determining control signal from a center frequency F_OL by an amount proportional to F_DEV(t). The perturbation generator 338 and generation of the perturbed PWM input frequency control values F_CTL_PTB(t) are described in further detail below.

The frequency response measurement logic module 333 also includes a frequency response calculator 345. The frequency response calculator 345 includes a dual-DFT cross-correlator 350 coupled to the perturbation generator 338. The cross-correlator 350 receives a time-sequenced set of perturbed output voltage sample values V_OUT_PTB(t) from the ADC 133 during a measurement sampling period. Each value V_OUT_PTB(t) corresponds to a value of F_CTL_PTB(t) at the sampling time t. The ADC 133 The cross-correlator 350 correlates the perturbed PWM input frequency control values to the perturbed power stage output voltage values.

The frequency response calculator 345 also includes a frequency response calculation logic module 355 coupled to the DFT cross-correlator 350. The frequency response calculation logic module 355 receives the correlated perturbed PWM input frequency control values and the perturbed power stage output voltage values from the cross-correlator 350. From the latter values, the frequency response calculation logic module 355 calculates a complex pair of frequency response values H(F_RESP)_RE and H(F_RESP)_IMG (collectively, "H(F_RESP)") for the selected characterization frequency F_RESP.

The frequency response measurement logic module 333 includes a power stage transfer function table 360 coupled to the frequency response calculation logic module 355. The power stage transfer function table 360 stores H(F_RESP) for each selected value of F_RESP from F_RESP=0 to a selected maximum value of F_RESP. Power stage control input control signal perturbation, perturbed voltage output sampling, and frequency response calculation operations are repeated for incremental values of F_RESP. Upon completion, the power stage transfer function table 360 will contain a complete set of power stage frequency response values for the incremental range of F_RESP from 0.0 Hz to a maximum frequency for which characterization of the converter power stage is desired. The post-characterization contents of the power stage transfer function table 360 thus substantially represents, in lookup form, the transfer function H of the converter power stage 215.

Frequency response values accessed from the power stage transfer function table 360 represent the control-to-output behavior of the power stage 215 across the measured range of control frequencies and may be used by the power converter 300 for various purposes. During operational mode, for example, a control loop shaping logic module 365 may assist in selecting a compensator structure using the populated power stage transfer function table 360 to maintain a desired control performance across the control frequency range.

In another example, a power-on test logic module 370 may contain a set of power stage frequency response values representing a power stage transfer function of a known properly-operating power stage. The stored "known-good" set of frequency response values may be generated by the power converter 300 during manufacturing testing, for example, or may be a set of average values measured from a number of units of the power converter 300. During each power-on self test of the power converter 300, the FCT circuit 305 may be placed in characterization mode and a new values may be entered into the power stage transfer function table 360. The new values may then be compared to the known good values stored in the power-on test logic module 370. Differences between the newly-measured values and the known-good values greater than predetermined amounts may trigger additional power-on testing or may flag a failure of the power converter 300.

Figure 4:
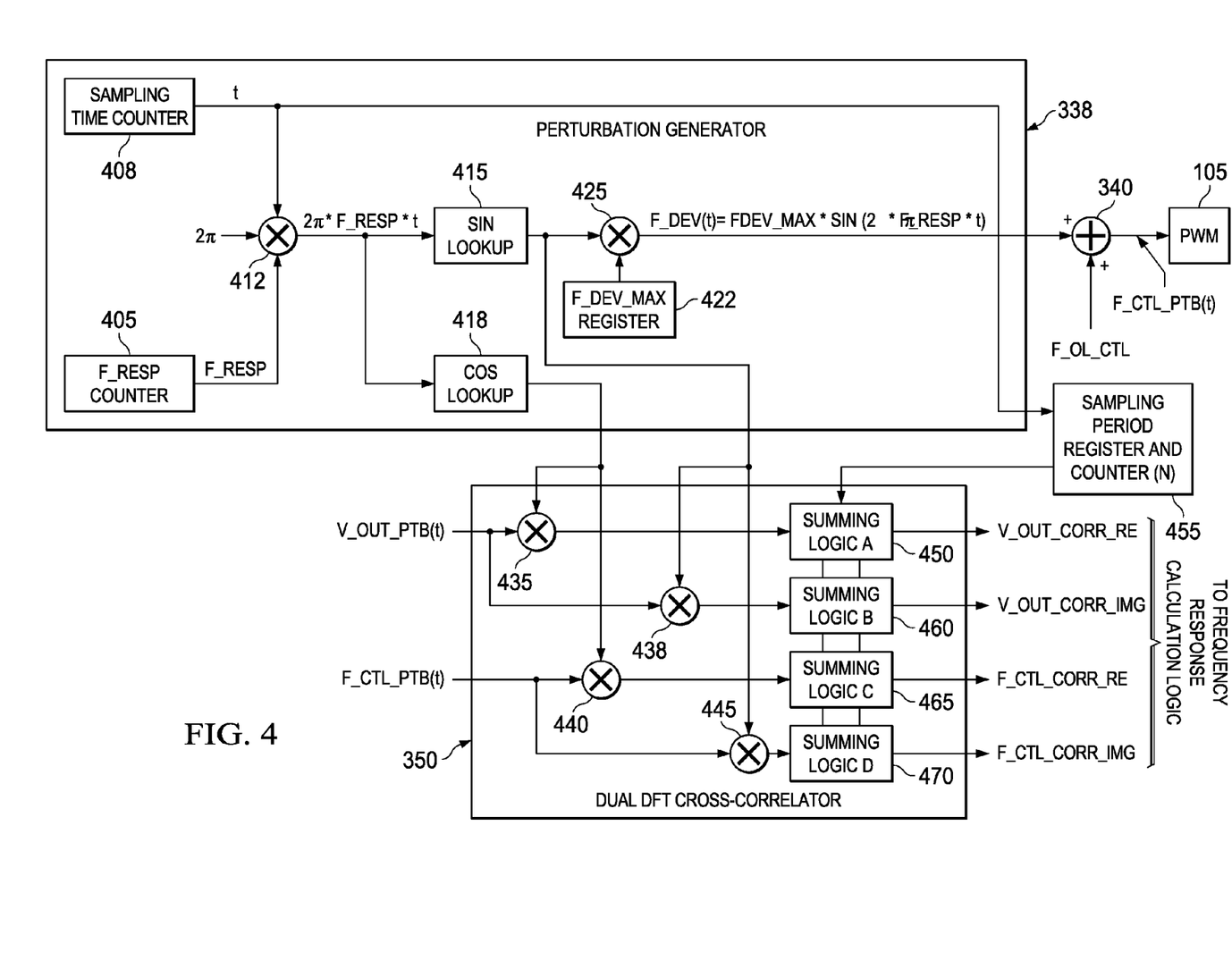
FIG. 4 is a detailed block diagram of portions of an example converter frequency response measurement logic module in a frequency-controlled power converter according to various embodiments.

FIG. 4 is a detailed block diagram of portions of an example converter frequency response measurement logic module 333 in a frequency-controlled power converter 300 according to various embodiments. FIG. 4 includes additional structural detail of the perturbation generator 338 and the DFT cross-correlator 350 of the converter frequency response measurement logic module 333 discussed above with reference to FIG. 3.

Figure 5:
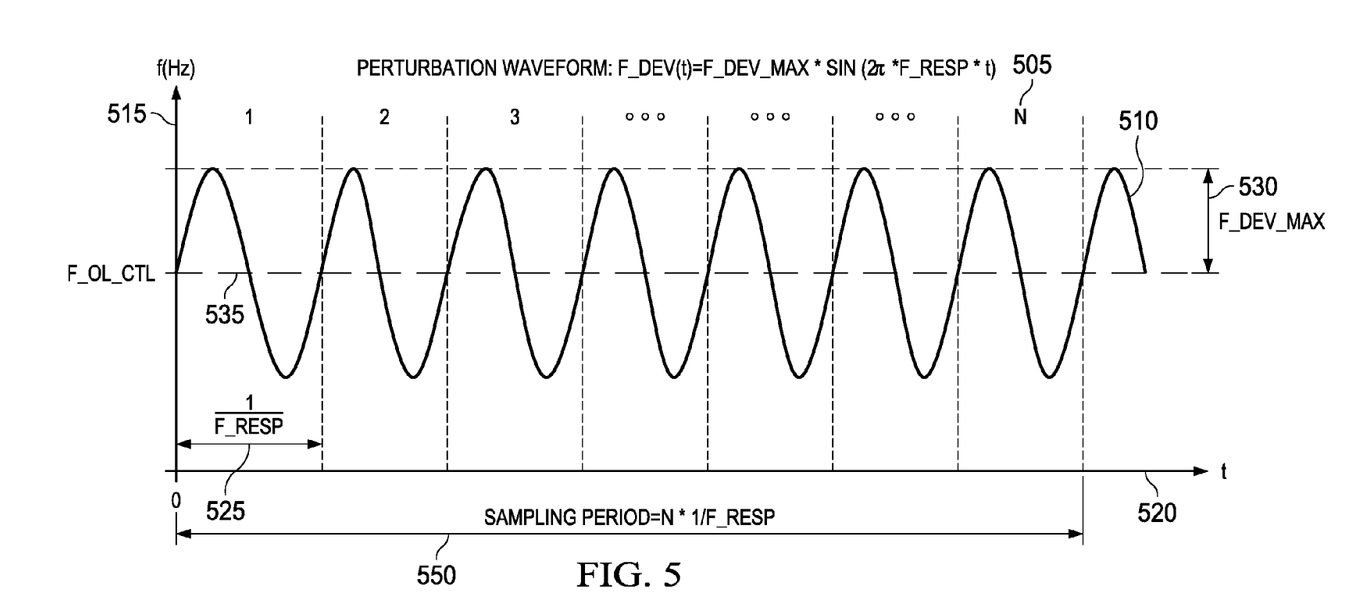
FIG. 5 is a plot of a sinusoidal perturbation waveform representing time-sequenced frequency deviation values generated by a perturbation generator according to various embodiments.

FIG. 5 is a plot of a perturbation waveform 510 representing frequency deviation sample values generated by the perturbation generator 338 according to various embodiments. Reference will be made to the plot of FIG. 5 while discussing the structural detail of the perturbation generator 338 of FIG. 4.

Figure 6:
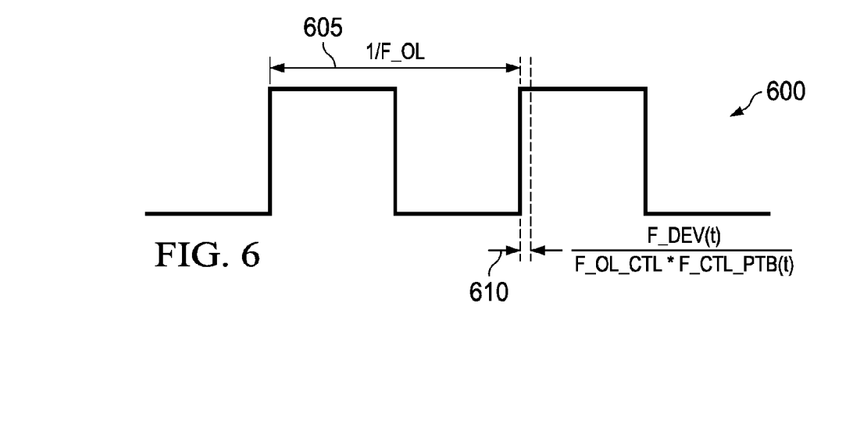
FIG. 6 is a plot of a power converter PWM output control signal as perturbed by samples generated by a perturbation generator according to various embodiments.

FIG. 6 is a plot of a power converter PWM control signal 600 as perturbed by samples generated by the perturbation generator 338 according to various embodiments. Reference will also be made to the plot of FIG. 6 while discussing the structural detail of the perturbation generator 338 of FIG. 4.

Turning back now to FIG. 4, the perturbation generator 338 provides a time-sequenced set of frequency deviation sample values during a sampling period (e.g., the sampling period 550 of FIG. 5) of a selected number N 505 of cycles of the sinusoidal perturbation waveform 510. It is noted that the magnitude axis of the plot of FIG. 5 is a frequency dimension, in units of Hertz. Each frequency deviation sample value corresponds to a frequency magnitude F_DEV(t) of the sinusoidal perturbation waveform 510 at an incremental sampling time t.

The perturbation generator 338 includes an F_RESP counter 405. The F_RESP counter 405 generates a value of F_RESP corresponding to a frequency at which the converter power stage 215 is to be measured. The period 1/F_RESP 525 of the sinusoidal perturbation waveform 510 is shown on FIG. 5. Each value of F_RESP generated results in an entry into the power stage transfer function table 360 of a complex pair of frequency response values measured for the current value of F_RESP.

The perturbation generator 338 also includes a sampling time counter 408. The sampling time counter 408 incrementally generates values of a time axis 520 variable t. Each value of t determines a frequency magnitude point of the sinusoidal perturbation waveform 510 corresponding to a perturbation magnitude portion of a control word to be loaded into the PWM during characterization mode operation of the FCT circuit 305 of FIG. 3. Each value of t also used by the ADC 133 to sample the perturbed converter output voltage signal.

The perturbation generator 338 also includes a first multiplier 412 coupled to the F_RESP counter 405 and to the sampling time counter 408. The first multiplier 412 multiplies a constant $2\pi$ (radians/cycle) by F_RESP (cycles/sec) and by t (seconds) to generate an angular quantity $2\pi*F\_RESP*t$ (radians). The perturbation generator 338 further includes a sine lookup table or a sine generator 415 coupled to the first multiplier 412. The sine lookup table 415 generates a unit-less quantity $SIN(2\pi*F\_RESP*t)$. The perturbation generator 338 also includes a register 422 to store a peak value F_DEV_MAX 530 (units of Hz) of the sinusoidal perturbation waveform 510. The perturbation generator 338 further includes a second multiplier 425 coupled to the register 422 and to the sine lookup table 415. The second multiplier 425 multiplies $SIN(2\pi*F\_RESP*t)$ by F_DEV_MAX 530 and outputs the result as a perturbation control value $F\_DEV(t)=F\_DEV\_MAX\ 530*SIN(2\pi*F\_RESP*t)$.

The perturbation control value is interpreted graphically on FIG. 5 as a magnitude at a time increment t of the sinusoidal perturbation waveform 510 defined by $F\_DEV(t)=F\_DEV\_MAX\ 530*SIN(2\pi*F\_RESP*t)$, with F_DEV_MAX 530<<F_OL_CTL 535 and F_RESP<<F_OL_CTL 535. It is noted that the latter frequency magnitude constraints are not shown on FIG. 5. Specifically, for purposes of clarity of illustration, F_DEV_MAX 530 is illustrated as being much larger compared to F_OL_CTL than as generated by the perturbation generator 338.

An adder 340 is coupled to the second multiplier 425. The adder 340 sums F_DEV(t) and a center frequency-determining control value F_OL_CTL 535, resulting in a perturbed PWM control value F_CTL_PTB(t). F_CTL_PTB(t) is interpreted graphically on FIG. 5 as a magnitude of the sinusoidal perturbation waveform 510 at a time increment t, added to the non time-variant center frequency-determining control value F_OL_CTL 535.

FIG. 6 is a plot of a power converter PWM output control signal 600 as perturbed by samples generated by a perturbation generator according to various embodiments. The period 605 corresponds to the center frequency F_OL of the control signal 600. F_OL is determined by the non time-variant center frequency-determining control value F_OL_CTL 535, an input to the adder 340 of FIG. 4. The period 610 of the perturbation component of the frequency of the control signal 600 at any time t is equal to F_DEV(t)/[F_OL_CTL*F_CTL_PTB(t)], where F_OL is equal to F_OL_CTL.

The perturbation generator 338 also includes a cosine lookup table or a cosine generator 418 coupled to the first multiplier 412. The cosine lookup table 418 generates a unit-less quantity $COS(2\pi*F\_RESP*t)$.

The dual DFT cross-correlator 350 includes a sampling period register and counter 455 coupled to the sampling time counter 408. The sampling period register and counter 455 determines a sampling period 550 during which perturbated converter output sample values V_OUT_PTB(t) are received and cross-correlated to the time-sequenced, perturbed PWM input control frequency values F_CTL_PTB(t). The duration of the sampling period 550 is from $t=0$ to $t=N*(1/F\_RESP)$. The sampling period register and counter 455 stores the selected number N 505 of cycles of the sinusoidal perturbation waveform 510 and increments N 505 following each cycle period 1/F_RESP 525.

The cross-correlator 550 also includes a first multiplier 435 coupled to the perturbation generator 338. For each incremental sample time t, the first multiplier 435 multiplies V_OUT_PTB(t) by $COS(2\pi*F\_RESP*t)$. The cross-correlator 550 also includes a first summing logic module 450 coupled to the first multiplier 435. The first summing logic module 450 sums values output from the first multiplier 435 during the sampling period 550 to generate a real component of a correlated perturbed converter output V_OUT_CORR_RE.

The cross-correlator 550 also includes a second multiplier 438 coupled to the perturbation generator 338. For each incremental sample time t, the second multiplier 438 multiplies V_OUT_PTB(t) by $SIN(2\pi*F\_RESP*t)$. The cross-correlator 550 also includes a second summing logic module 460 coupled to the second multiplier 438. The second summing logic module 460 sums values output from the second multiplier 438 during the sampling period 550 to generate an imaginary component of a correlated perturbed converter output V_OUT_CORR_IMG.

The cross-correlator 550 also includes a third multiplier 440 coupled to the perturbation generator 338. For each incremental sample time t, the third multiplier 440 multiplies F_CTL_PTB(t) by $COS(2\pi*F\_RESP*t)$. The cross-correlator 550 also includes a third summing logic module 465 coupled to the third multiplier 440. The third summing logic module 465 sums values output from the third multiplier 440 during the sampling period 550 to generate a real component of a correlated perturbed converter frequency control input F_CTL_CORR_RE.

The cross-correlator 550 also includes a fourth multiplier 445 coupled to the perturbation generator 338. For each incremental sample time t, the fourth multiplier 445 multiplies F_CTL_PTB(t) by $SIN(2\pi*F\_RESP*t)$. The cross-correlator 550 also includes a fourth summing logic module 470 coupled to the fourth multiplier 445. The fourth summing logic module 470 sums values output from the fourth multiplier 445 during the sampling period 550 to generate an imaginary component of a correlated perturbed converter frequency control input F_CTL_CORR_IMG.

Turning back now to FIG. 3, the frequency response calculation logic module 355 calculates the value of a real component of the power stage frequency response corresponding to the currently selected value of F_RESP as $H(F\_RESP)\_RE=\{[F\_CTL\_CORR\_RE(F\_RESP)*V\_OUT\_CORR\_RE(F\_RESP)]+[F\_CTL\_CORR\_IMG(F\_RESP)*V\_OUT\_CORR\_IMG(F\_RESP)]\}/[F\_CTL\_CORR\_RE(F\_RESP)^2+F\_CTL\_CORR\_IMG(F\_RESP)^2]$.

The frequency response calculation logic module 355 calculates the value of an imaginary component of the power stage frequency response corresponding to the currently selected value of F_RESP as $H(F\_RESP)\_IMG=j$ {[F_CTL_CORR_RE(F_RESP)*V_OUT_CORR_IMG (F_RESP)]−[F_CTL_CORR_IMG(F_RESP)*V_OUT_CORR_RE(F_RESP)]}/[F_CTL_CORR_RE(F_RESP)^2+ F_CTL_CORR_IMG(F_RESP)^2].

Some embodiments may convert the values of H(F_RESP)_RE and H(F_RESP)_IMG stored in the power stage transfer function table of FIG. 3 to more engineering-friendly Bode plot magnitude and phase format.

Figure 7A:
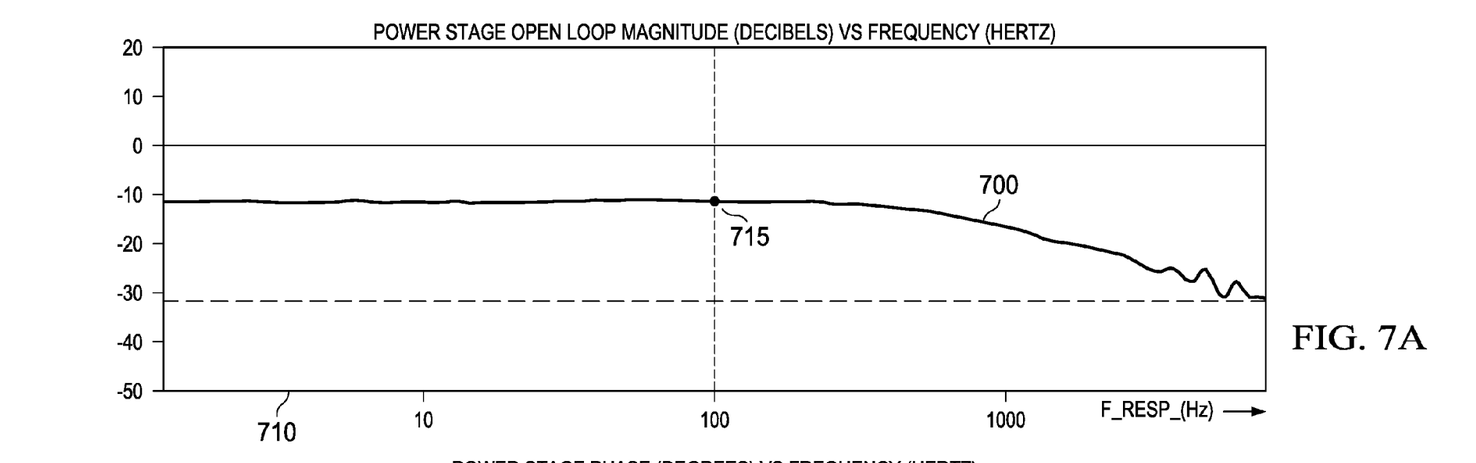
FIG. 7A is a magnitude plot portion of a frequency response characterization of a power converter power stage using data points generated by a converter frequency response measurement logic module according to various embodiments.

FIG. 7A is a magnitude plot portion 700 of a frequency response characterization of a power converter power stage (e.g., the power stage 215 of FIG. 3) using data points generated by a converter frequency response measurement logic module (e.g., the converter frequency response measurement logic module 333 of FIG. 3) according to various embodiments. Each magnitude value of the magnitude plot 700 is equal to $20*\log_{10}[H(F\_RESP)\_RE^2+H(F\_RESP)\_IMG^2]^{1/2}$ in units of decibels. For example, the magnitude 715 of the power stage frequency response at 100 Hz is approximately −12 decibels.

Figure 7B:
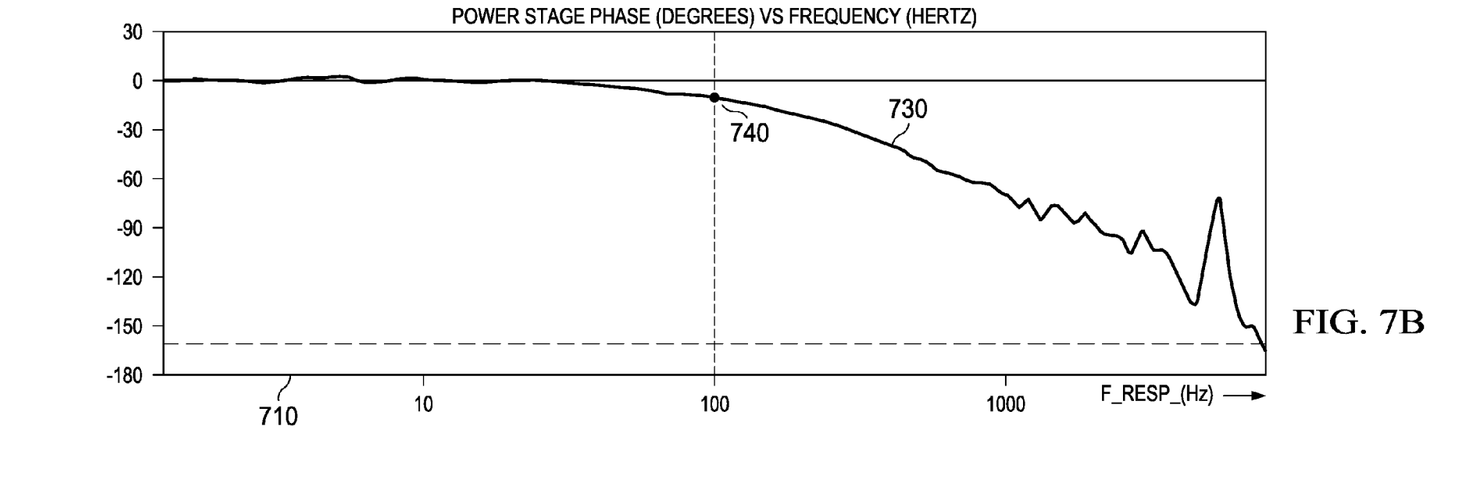
FIG. 7B is a phase plot portion of a frequency response characterization of a power converter power stage using data points generated by a converter frequency response measurement logic module according to various embodiments.

FIG. 7B is a phase plot portion 730 of a frequency response characterization of a power converter power stage (e.g., the power stage 215 of FIG. 3) using data points generated by a converter frequency response measurement logic module (e.g., the converter frequency response measurement logic module 333 of FIG. 3) according to various embodiments. Each phase shift value of the phase plot 730 is equal to ARG[H(F_RESP)_RE+H(F_RESP)_IMG]=ARCTAN[H(F_RESP)_IMG/H(F_RESP)_RE in degrees. For example, the phase shift 740 of the power stage frequency response at 100 Hz is approximately 10 degrees.

Figure 8:
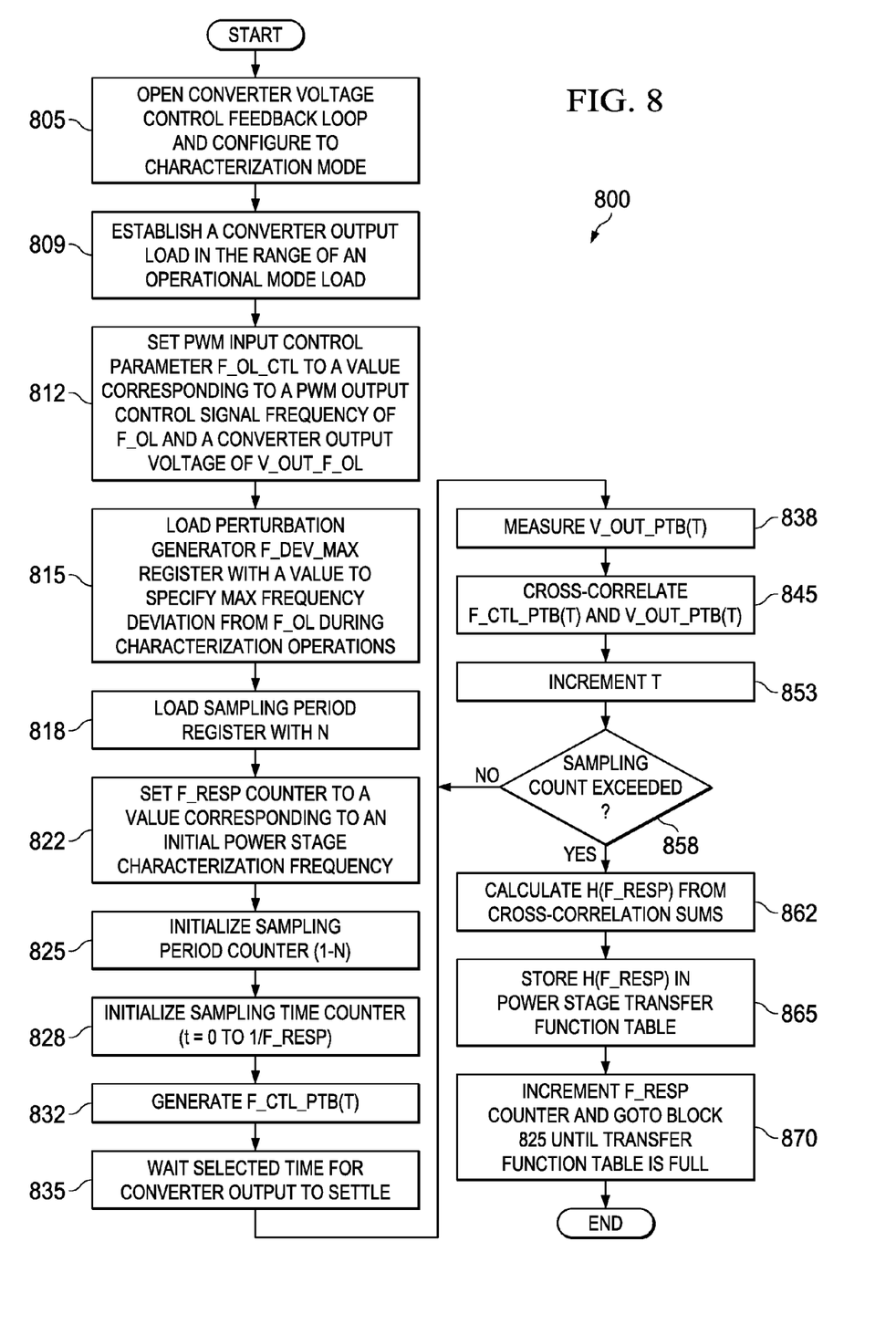
FIG. 8 is a flow diagram of a method of characterizing the frequency response of a power stage in a frequency-controlled power converter according to various example sequences.

FIG. 8 is a flow diagram of a method 800 of characterizing the frequency response of a power stage in a frequency-controlled power converter according to various example sequences. The method 800 includes perturbing a converter frequency control signal by known amounts, at incremental times, and with a periodicity corresponding to a selected frequency F_RESP at which the response of the power stage is to be measured, all from within a feedback control circuit associated with the power converter. The method 800 also includes sampling a converter output voltage at the incremental times following a pre-calculation settling period and during a sampling period. The method 800 further includes cross-correlating values of the perturbed frequency control signal and the output voltage samples at the incremental times. The method 800 further includes calculating the frequency response of the power stage at the frequency corresponding to the periodicity of the perturbed frequency control signal from the cross-correlated values. The method 800 also includes ceasing the perturbation for a post-calculation settling period prior to characterizing the power stage at another frequency F_RESP.

The method 800 commences at block 805 with opening a converter output control feedback loop in an FCT circuit and configuring the FCT circuit for characterization mode operation. The method 800 continues at block 809 with establishing a converter output load to approximate an operational mode load. The method 800 also includes setting a PWM input control parameter F_OL_CTL to a value corresponding to a PWM output control signal frequency of F_OL and corresponding to a voltage converter output voltage of V_OUT_F_OL, at block 812.

The method 800 also includes loading a register in a perturbation generator with a value F_DEV_MAX to specify a maximum frequency deviation from F_OL during characterization operations, at block 815. The method 800 further includes loading a sampling period register with an integer value N representing a number of perturbation waveform periods to include in the sampling period, at block 818. The method 800 also includes initializing an F_RESP counter to a value corresponding to an initial power stage characterization frequency, at block 822. The method 800 further includes initializing a sampling period counter, at block 825. The sampling period counter counts from 1 to N. The method 800 also includes initializing a sampling time counter, at block 828. The sampling time counter counts from t=0 to t=N*1/F_RESP.

The method 800 includes generating a time-sequenced set of perturbed PWM input frequency control values F_CTL_PTB(t), loading each value of F_CTL_PTB(t) into a control loop PWM, and deviating a converter output voltage-determining control signal from a center frequency F_OL by an amount proportional to F_DEV(t), at block 832. Each value of F_CTL_PTB(t) is the sum of a frequency deviation sample value F_DEV(t) and F_OL_CTL. Each frequency deviation sample value F_DEV(t) corresponds to a magnitude of the perturbation waveform of the selected frequency F_RESP at the incremental sampling time t.

The method 800 continues at block 835 with waiting for the converter output to settle. The method 800 includes sampling a converter output voltage perturbed by F_DEV(t) at the sampling time t corresponding to each F_CTL_PTB(t) during a sampling period of a selected number N of periods of the perturbation waveform to measure a corresponding V_OUT_PTB(t), at block 838.

The method 800 also includes performing cross-correlation operations on the set of perturbed frequency control values F_CTL_PTB(t) and on the corresponding set of perturbed output voltage sample values V_OUT_PTB(t), at block 845. The method 800 includes summing each cross-correlation multiplication component, at block 848, while incrementing t, at block 853. Each sum represents real and imaginary component values F_CTL_CORR_RE(F_RESP) and F_CTL_CORR_IMG(F_RESP) of the cross-correlated set of perturbed control values F_CTL_PTB(t) and real and imaginary component values V_OUT_CORR_RE (F_RESP) and V_OUT_CORR_IMG(F_RESP) of the cross-correlated set of perturbed output voltage sample values V_OUT_PTB(t).

The method 800 includes determining whether the sampling period has expired, at block 858. If not, the method 800 continues at block 838 with obtaining additional values of V_OUT_PTB(t). If the sampling period has expired, the method 800 continues at block 862 with calculating real and imaginary component values of a frequency response H(F_RESP) of the power stage for the selected frequency F_RESP. H(F_RESP) is calculated from the correlated values F_CTL_CORR_RE(F_RESP), F_CTL_CORR_IMG (F_RESP), V_OUT_CORR_RE(F_RESP) and V_OUT_CORR_IMG(F_RESP). The method 800 further includes storing H(F_RESP) in a power stage transfer function table, at block 865.

The method 800 includes changing the selected frequency F_RESP incrementally in order to obtain a set of H(F_RESP) corresponding to a frequency range across which the power stage is characterized, at block 870. At this point, the method 800 terminates, as the power stage transfer function table has been filled.

Apparatus and methods described herein may be useful in applications other than characterizing the frequency response of a frequency-controlled power converter power stage. The examples of the frequency-controlled power converter 300 and 400 and of the method 800 described herein are intended to provide a general understanding of the structures of various embodiments and the sequences associated with various methods. They are not intended to serve as complete descriptions of all elements and features of apparatus, systems and methods that might make use of these example structures and sequences.

By way of illustration and not of limitation, the accompanying figures show specific embodiments in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense. The breadth of various embodiments is defined by the appended claims and the full range of equivalents to which such claims are entitled.

Such embodiments of the inventive subject matter may be referred to herein individually or collectively by the term "invention" merely for convenience and without intending to voluntarily limit this application to any single invention or inventive concept, if more than one is in fact disclosed. Accordingly, although specific embodiments have been illustrated and described herein, any arrangement calculated to achieve the same purpose may be substituted for the specific embodiments shown. This disclosure is intended to cover any and all adaptations or variations of various embodiments.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing with the claims from which it depends as a separate embodiment.

What is claimed is:

1. A power converter incorporating a frequency response characterization apparatus, comprising:
a frequency-controlled power stage;
a perturbation generator in a converter frequency response measurement logic module within a feedback control and test circuit portion of the power converter, the perturbation generator to generate a periodic, incrementally time-sequenced set of discrete frequency deviation control values F_DEV(t)=F_DEV_MAX*SIN(2π*F_RESP*t);
an adder coupled to the perturbation generator to add each value of F_DEV(t) to a center frequency-determining control value F_OL_CTL and to output the sums as a time-sequenced set of perturbed frequency control values F_CTL_PTB(t);
an analog-to-digital converter ("ADC") coupled to a power stage output terminal to sample a converter output voltage perturbed by F_DEV(t) at incremental times t corresponding to each F_CTL_PTB(t) during a sampling period and to provide a resulting time-sequenced set of perturbed output voltage sample values V_OUT_PTB(t); and
a frequency response calculator coupled to an ADC output terminal to receive each F_CTL_PTB(t) and each corresponding V_OUT_PTB(t) during the sampling period, to perform cross-correlation operations on the set of perturbed control values F_CTL_PTB(t) and on the corresponding set of perturbed output voltage sample values V_OUT_PTB(t), the cross-correlation operations to generate real and imaginary component values F_CTL_CORR_RE(F_RESP) and F_CTL_CORR_IMG(F_RESP) of the cross-correlated set of perturbed control values F_CTL_PTB(t), to generate real and imaginary component values V_OUT_CORR_RE(F_RESP) and V_OUT_CORR_IMG(F_RESP) of the cross-correlated set of perturbed output voltage sample values V_OUT_PTB(t), and to calculate real and imaginary component values of a frequency response H(F_RESP) of the power stage for the selected frequency F_RESP from the values F_CTL_CORR_RE(F_RESP), F_CTL_CORR_IMG(F_RESP), V_OUT_CORR_RE(F_RESP) and V_OUT_CORR_IMG(F_RESP).

2. The power converter of claim 1, the set of discrete frequency deviation control values F_DEV(t), if plotted as a function of incremental values of t, to form a shape of a sinusoidal waveform having a selected frequency F_RESP equal to a frequency at which a response of the power stage is to be measured.

3. The power converter of claim 1, further comprising:
a mode control switch coupled to the ADC to close a feedback control path by directing ADC output values representing converter output voltage levels to an output control circuit while configured for a closed-loop operational mode and to open the feedback control path by directing the ADC output values to a converter frequency response measurement logic module while configured for an open-loop characterization mode; and
a mode control logic module coupled to the mode control switch to configure the feedback control and test circuit for the closed-loop operational mode or for the open-loop characterization mode.

4. The power converter of claim 1, further comprising:
a control loop pulse-width modulator ("PWM") to receive the time-sequenced set of perturbed frequency control values F_CTL_PTB(t) and to incrementally deviate a converter output voltage-determining control signal from a center frequency F_OL by an amount proportional to F_DEV(t) and with a periodicity of F_RESP.

5. The power converter of claim 1, the frequency response calculator comprising:
a dual discrete Fourier transform ("DFT") cross-correlator coupled to the perturbation generator and communicatively coupled to the ADC to perform the correlation operations; and
a frequency response calculation logic module coupled to the DFT cross-correlator to generate the real and imaginary component values of the frequency response H(F_RESP) of the power stage for the selected frequency F_RESP.

6. The power converter of claim 5, the dual DFT cross-correlator comprising:
a sampling period register and counter to store the selected number N of periods of the perturbation waveform corresponding to a sampling period of t=0 to t=N*(1/F_RESP) and to increment N following each cycle period 1/F_RESP;

a first multiplier coupled to the ADC to multiply, for each incremental sample time t, V_OUT_PTB(t) by COS(2π*F_RESP*t);

a first summing logic module coupled to the first multiplier and to the sampling period register and counter to sum output values of the first multiplier during the sampling period of the selected number N of cycles of the perturbation waveform;

a second multiplier coupled to the ADC to multiply, for each incremental sample time t, V_OUT_PTB(t) by SIN(2π*F_RESP*t);

a second summing logic module coupled to the second multiplier and to the sampling period register and counter to sum output values of the second multiplier during the sampling period;

a third multiplier coupled to receive F_CTL_PTB(t) and to multiply, for each incremental sample time t, F_CTL_PTB(t) by COS(2π*F_RESP*t);

a third summing logic module coupled to the third multiplier and to the sampling period register and counter to sum output values of the third multiplier during the sampling period;

a fourth multiplier to receive F_CTL_PTB(t) and to multiply, for each incremental sample time t, F_CTL_PTB(t) by SIN(2π*F_RESP*t); and a fourth summing logic module coupled to the fourth adder and to the sampling period register and counter to sum output values of the fourth multiplier during the sampling period.

7. The power converter of claim 5, the real component value of the frequency response of the power stage calculated by the frequency response calculation logic module as H(F_RESP)_RE={[F_CTL_CORR_RE(F_RESP)*V_OUT_CORR_RE(F_RESP)]+[F_CTL_CORR_IMG(F_RESP)*V_OUT_CORR_IMG(F_RESP)]}/[F_CTL_CORR_RE(F_RESP)^2+F_CTL_CORR_IMG(F_RESP)^2].

8. The power converter of claim 7, the imaginary component value of the frequency response of the power stage calculated by the frequency response calculation logic module as H(F_RESP)_IMG=j {[F_CTL_CORR_RE(F_RESP)*V_OUT_CORR_IMG(F_RESP)]−[F_CTL_CORR_IMG(F_RESP)*V_OUT_CORR_RE(F_RESP)]}/[F_CTL_CORR_RE(F_RESP)^2+F_CTL_CORR_IMG(F_RESP)^2].

9. The power converter of claim 8, further comprising:
a power stage transfer function table coupled to the frequency response calculation logic module to store H(F_RESP)_RE and H(F_RESP)_IMG as determined by the converter frequency response measurement logic module for selected incremental values of F_RESP from F_RESP=0 to a selected maximum value of F_RESP such that, when completed, the power stage transfer function table values represent the frequency response of the converter power stage.

10. The power converter of claim 9, further comprising:
a control loop shaping logic module coupled to the power stage transfer function table and to an output control circuit to perform anticipatory control loop shaping operations during a closed-loop operational mode by accessing the power stage transfer function table to find a PWM frequency control value expected to cause a reduction in a converter output voltage error.

11. A power converter incorporating a frequency response characterization apparatus, comprising:
a frequency-controlled power stage;
a perturbation generator incorporated into a converter frequency response measurement logic module within a feedback control and test circuit portion of the power converter, the perturbation generator to generate a sinusoidal perturbation waveform of a selected frequency F_RESP, each of a set of perturbed control values derived from the sinusoidal perturbation waveform to cause deviations of a converter output voltage-determining control signal from a center frequency F_OL;
an analog-to-digital converter ("ADC") coupled to a power stage output terminal to sample a converter output voltage perturbed as a result of the deviations of the converter output voltage-determining control signal; and
a frequency response calculator coupled to an ADC output terminal to receive a set of perturbed output voltage sample values corresponding to the set of perturbed control values, to perform cross-correlation operations on the set of perturbed control values and on the corresponding set of perturbed output voltage sample values, and to generate real and imaginary component values of a frequency response of the power stage at the selected frequency F_RESP.

12. The power converter of claim 11, further comprising:
a mode control switch coupled to the ADC to close a feedback control path by directing ADC output values representing converter output voltage levels to an output control circuit while configured for closed-loop operational mode or to open the feedback control path by directing the ADC output values to the frequency response calculator while configured for open-loop characterization mode; and
a mode control logic module coupled to the mode control switch to configure the feedback control and test circuit to a closed-loop operational mode or to an open-loop characterization mode.

13. The power converter of claim 11, the perturbation generator comprising:
an F_RESP counter to generate a value of F_RESP corresponding to a frequency at which the converter power stage is to be characterized;
a sampling time counter to incrementally generate values of t, each value of t to determine a frequency magnitude point of the sinusoidal perturbation waveform corresponding to a perturbation magnitude portion of a control word to be loaded into a pulse width modulator used to establish a frequency of a power stage input control signal, each value of t also used by the ADC to sample the perturbed converter output voltage signal;
a first multiplier coupled to the F_RESP counter and to the sampling time counter to multiply a constant 2π (radians/cycle) by F_RESP (cycles/sec) and by t (seconds) to generate an angular quantity 2π*F_RESP*t (radians);
a sine lookup table or a sine generator coupled to the first multiplier to generate the unit-less quantity SIN(2π*F_RESP*t);
a register to store a peak value F_DEV_MAX (Hz) of the perturbation waveform; and
a second multiplier coupled to the sine lookup table and to the register to multiply SIN(2π*F_RESP*t) by F_DEV_MAX and to output the result as a magnitude F_DEV(t)=F_DEV_MAX*SIN(2π*F_RESP*t) of the perturbation waveform at a time equal to t.

14. The power converter of claim 13, the perturbation generator further comprising:
   a cosine lookup table or a cosine generator coupled to the first multiplier to generate a unit-less quantity COS (2π*F_RESP*t).

15. The power converter of claim 11, further comprising:
   an adder coupled to the perturbation generator to sum F_DEV(t) and a value of a center frequency-establishing component F_OL_CTL of a perturbed PWM control word, the sum of F_DEV(t) and F_OL_CTL being the perturbed PWM control word F_CTL_PTB(t).

16. A method of characterizing a frequency response of a power stage in a frequency-controlled power converter, comprising:
   from within a feedback control circuit associated with the power converter, perturbing a converter frequency control signal by known amounts, at incremental times, and with a periodicity corresponding to a selected frequency F_RESP at which the response of the power stage is to be measured;
   following a pre-calculation settling period and during a sampling period, sampling a converter output voltage at the incremental times;
   cross-correlating values of the perturbed frequency control signal and the output voltage samples at the incremental times;
   calculating the frequency response of the power stage at the frequency corresponding to the periodicity of the perturbed frequency control signal from the cross-correlated values; and
   ceasing the perturbation for a post-calculation settling period.

17. The method of characterizing a frequency response of a power stage of a frequency-controlled power converter of claim 16, further comprising:
   generating a time-sequenced set of frequency deviation sample values from a sinusoidal perturbation waveform of the selected frequency F_RESP, each frequency deviation sample value corresponding to a frequency magnitude F_DEV(t) of the sinusoidal perturbation waveform at an incremental sampling time t;
   adding F_DEV(t) to a center frequency-determining value F_OL_CTL to obtain a perturbed frequency control value F_CTL_PTB(t);
   loading a control loop pulse-width modulator ("PWM") with F_CTL_PTB(t); and
   causing a converter output voltage-determining control signal to deviate from a center frequency F_OL by an amount proportional to F_DEV(t).

18. The method of characterizing a frequency response of a power stage of a frequency-controlled power converter of claim 17, further comprising:
   during a sampling period of a selected number N of cycles of the sinusoidal perturbation waveform, sampling a converter output voltage perturbed by F_DEV(t) at the sampling time t corresponding to each F_CTL_PTB(t) to provide a time-sequenced set of perturbed output voltage sample values V_OUT_PTB(t), each V_OUT_PTB(t) corresponding to a value of F_CTL_PTB(t) at the sampling time t; and
   performing cross-correlation operations on the set of perturbed control values F_CTL_PTB(t) and on the corresponding set of perturbed output voltage sample values V_OUT_PTB(t) to generate real and imaginary component values F_CTL_CORR_RE(F_RESP) and F_CTL_CORR_IMG(F_RESP) of the cross-correlated set of perturbed control values F_CTL_PTB(t) and to generate real and imaginary component values V_OUT_CORR_RE(F_RESP) and V_OUT_CORR_IMG(F_RESP) of the cross-correlated set of perturbed output voltage sample values V_OUT_PTB(t).

19. The method of characterizing a frequency response of a power stage of a frequency-controlled power converter of claim 18, further comprising:
   generating real and imaginary component values of a frequency response H(F_RESP) of the power stage for the selected frequency F_RESP using the values F_CTL_CORR_RE(F_RESP), F_CTL_CORR_IMG(F_RESP), V_OUT_CORR_RE(F_RESP) and V_OUT_CORR_IMG(F_RESP).

20. The method of characterizing a frequency response of a power stage of a frequency-controlled power converter of claim 16, further comprising:
   changing the selected frequency F_RESP incrementally in order to obtain a set of H(F_RESP) corresponding to a frequency range across which the power stage is characterized; and
   storing the set of H(F_RESP) in a power stage transfer function table.

* * * * *